United States Patent
Fan et al.

(10) Patent No.: US 11,018,810 B2
(45) Date of Patent: May 25, 2021

(54) ADAPTIVE MULTIPLE HARQ ENTITY DESIGN

(71) Applicant: Telefonaktiebolaget LM Ericsson (publ), Stockholm (SE)

(72) Inventors: Rui Fan, Beijing (CN); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 40 days.

(21) Appl. No.: 16/473,268

(22) PCT Filed: Dec. 4, 2017

(86) PCT No.: PCT/SE2017/051208
§ 371 (c)(1),
(2) Date: Jun. 25, 2019

(87) PCT Pub. No.: WO2018/128568
PCT Pub. Date: Jul. 12, 2018

(65) Prior Publication Data
US 2019/0327031 A1    Oct. 24, 2019

(30) Foreign Application Priority Data

Jan. 5, 2017  (WO) ................ PCT/CN2017/070203

(51) Int. Cl.
*H04L 1/18*   (2006.01)
(52) U.S. Cl.
CPC .......... *H04L 1/1812* (2013.01); *H04L 1/1822* (2013.01); *H04L 1/1835* (2013.01); *H04L 1/1874* (2013.01)
(58) Field of Classification Search
CPC ... H04L 1/1812; H04L 1/1822; H04L 1/1835; H04L 1/1874
See application file for complete search history.

(56) References Cited

U.S. PATENT DOCUMENTS 10,104,584 B2 * 10/2018 Cai .................. H04W 72/1284
2007/0189206 A1   8/2007 Chandra et al.
(Continued)

FOREIGN PATENT DOCUMENTS

EP    2518927 A1   10/2012
WO   2007092257 A1  8/2007
(Continued)

OTHER PUBLICATIONS

H. Shariatmadari, S. Iraji, Z. Li, M. A. Uusitalo and R. Jäntti, "Optimized transmission and resource allocation strategies for ultra-reliable communications," 2016 IEEE 27th Annual International Symposium on Personal, Indoor, and Mobile Radio Communications (PIMRC), Valencia, 2016.*
(Continued)

*Primary Examiner* — Steve N Nguyen
(74) *Attorney, Agent, or Firm* — Withrow & Terranova, PLLC

(57) ABSTRACT

Systems and methods for an adaptive multiple Hybrid Automatic Repeat Request (HARQ) entity design to enable dynamic soft buffer sharing between HARQ entities are disclosed. In some embodiments, a transmitter estimates the total buffer consumption of the receiver. In response to determining that there is enough unused space in the soft buffer of the receiver for the new HARQ process of the HARQ entity, the transmitter assigns the new HARQ process of the HARQ entity for data transmission to the receiver. In this way, HARQ entity specific configurations may be enabled while increasing dynamic soft buffer sharing efficiency.

11 Claims, 8 Drawing Sheets

(56) References Cited

U.S. PATENT DOCUMENTS

| | | | | |
|---|---|---|---|---|
| 2009/0168920 | A1* | 7/2009 | Chen | H04L 1/1851 |
| | | | | 375/295 |
| 2010/0050034 | A1* | 2/2010 | Che | H04L 1/1845 |
| | | | | 714/748 |
| 2010/0199141 | A1* | 8/2010 | Parkvall | H04L 1/1835 |
| | | | | 714/749 |
| 2013/0028201 | A1* | 1/2013 | Koo | H04W 72/1215 |
| | | | | 370/329 |
| 2013/0051289 | A1 | 2/2013 | Hsieh et al. | |
| 2014/0199995 | A1* | 7/2014 | Singh | H04M 1/72522 |
| | | | | 455/426.1 |
| 2015/0103752 | A1 | 4/2015 | Yu et al. | |
| 2015/0327295 | A1* | 11/2015 | Yang | H04L 1/1854 |
| | | | | 370/337 |
| 2016/0088635 | A1* | 3/2016 | Davydov | H04L 1/1845 |
| | | | | 370/329 |
| 2016/0191225 | A1 | 6/2016 | Hwang et al. | |
| 2016/0219458 | A1* | 7/2016 | Kubota | H04W 28/0273 |
| 2016/0302224 | A1* | 10/2016 | Khairmode | H04L 1/1812 |

FOREIGN PATENT DOCUMENTS

| | | |
|---|---|---|
| WO | 2012063227 A2 | 5/2012 |
| WO | 2016010227 A1 | 1/2016 |

OTHER PUBLICATIONS

International Search Report and Written Opinion for International Patent Application No. PCT/SE2017/051208, dated Apr. 13, 2018, 11 pages.
International Preliminary Report on Patentability for International Patent Application No. PCT/SE2017/051208, dated Jan. 16, 2019, 13 pages.
Supplementary European Search Report for European Patent Application No. 17890823.2, dated Dec. 16, 2019, 3 pages.
Examination Report for European Patent Application No. 17890823,2, dated Feb. 12, 2020, 6 pages.

* cited by examiner

ADAPTIVE MULTIPLE HARQ ENTITY DESIGN

RELATED APPLICATIONS

This application is a 35 U.S.C. § 371 national phase filing of PCT patent application serial number PCT/SE2017/051208, filed Dec. 4, 2017, which claims the benefit of PCT patent application serial number PCT/CN2017/070203, filed Jan. 5, 2017, the disclosures of which are hereby incorporated herein by reference in their entireties.

TECHNICAL FIELD

The present disclosure relates to New Radio (NR) in Third Generation Partnership Project (3GPP) and operation of a soft buffer in Hybrid Automatic Repeat Request (HARQ) operations.

BACKGROUND

Fifth Generation (5G) is supposed to support multiple types of services using common Radio Access Network (RAN): enhanced Mobile Broadband (eMBB), massive Machine Type Communication (mMTC), and Ultra-Reliable and Low Latency Communication (URLLC). These services require different Qualities of Service (QoS): delay, data rate, and packet loss rate:
  URLLC requires low delay and/or high reliability;
  mMTC typically requires long battery lifetime but does not require low delay or high data rate, often combined with small infrequent packets;
  eMBB requires high data rate. Delay can be strict but typically less strict than in URLLC.

In order to fulfill the delay requirement of different services, mixed numerologies may be included in one carrier so that the services mentioned above can be served over one carrier. The subcarrier space can be $2^n \times 15$ kilohertz (kHz) and the n can be configurable. FIG. 1 shows the example of two numerologies mixed over one Component Carrier (CC).

Then there comes an issue on how to model Medium Access Control (MAC) for New Radio (NR) to serve a User Equipment device (UE) with radio resources of different properties in terms of at least one of numerology/slot duration, allocated bandwidth, and delay requirement for each numerology/slot duration.

For single Hybrid Automatic Repeat Request (HARQ) entity design, one common HARQ entity is shared between radio resources of different properties. Hence high sharing efficiency for HARQ process utility results when one UE can be simultaneously served with radio resources of different properties. One adaptive HARQ design has an adaptive number of HARQ processes within a maximum number of HARQ processes. FIG. 2 shows three examples. There can be up to sixteen HARQ processes with the HARQ entity and the transmitter determining the actual number of HARQ processes to be used according to the rule that the consumed soft buffer by the used HARQ processes (i.e., HARQ processes in pending state) shall not exceed the total soft buffer in the receiver side. Example 1 shows that there are sixteen HARQ processes in use, each with equal small soft buffer requirements. Example 2 shows there are five HARQ process in use; P0, P3, and P4 have small equal soft buffer requirements, and P1 and P2 have relatively larger equal soft buffer requirements. There is still a portion of unused soft buffer in the receiver. Example 3 shows two HARQ processes in use, each with large equal soft buffer requirements.

For a design with multiple HARQ entities, there are respective HARQ entities for radio resources of different properties. Compared to the design of a single HARQ entity, a benefit of this is low complexity for product design. For instance, the maximum number of HARQ retransmission attempts can be configured for each HARQ entity respectively. The HARQ Round-Trip Time (RTT) within one HARQ entity can be uniform; the HARQ process indicator for one resource pool can be localized so that a few bits could be used for the HARQ process indicator.

Single HARQ entity design has the benefit of dynamic HARQ process sharing between radio resources of different properties and multiple HARQ entity design has the benefit of configuration and low complexity for product delay. As such, a HARQ design that integrates the benefits of both designs is needed.

SUMMARY

Systems and methods for an adaptive multiple Hybrid Automatic Repeat Request (HARQ) entity design to enable dynamic soft buffer sharing between HARQ entities are disclosed. The number of HARQ processes in-use of one HARQ entity depends on the total soft buffer consumption of other HARQ entities. In some embodiments, the transmitter estimates the total buffer consumption by two or more HARQ entities at assignment of a HARQ process of a HARQ entity for data transmission.
  Compared to single HARQ entity design, these systems and methods may enable HARQ entity specific configuration such as HARQ Round-Trip Time (RTT), a maximum number of HARQ processes, and a number of bits of HARQ process indicator field in Downlink Control Information (DCI).
  Compared to multiple separate HARQ entities, these systems and methods may enable dynamic soft buffer sharing efficiency.

In some embodiments, a method of operation of a first node for communicating with a second node which has a soft buffer that is shared by more than one HARQ entity includes determining that a new HARQ process of a HARQ entity is desired. In response to determining that there is enough unused space in the soft buffer of the second node for the new HARQ process of the HARQ entity, the method also includes assigning the new HARQ process of the HARQ entity for data transmission to the second node. This may enable HARQ entity specific configurations while increasing dynamic soft buffer sharing efficiency. In some embodiments, the method also includes receiving an indication of usage of the soft buffer from the second node and estimating the total used space of the soft buffer of the second node by all HARQ entities which share the soft buffer.

In some embodiments, the method also includes, after assigning the new HARQ process of the HARQ entity for data transmission to the second node, increasing the estimated total used space of the soft buffer of the second node by the space required by the new HARQ process of the HARQ entity. In some embodiments, the method also includes receiving a HARQ feedback from the second node for a second HARQ process of a second HARQ entity and, in response to determining that the HARQ feedback is an Acknowledgement (ACK), decreasing the estimated total used space of the soft buffer of the second node by the space required by the second HARQ process.

In some embodiments, determining that the new HARQ process of the HARQ entity is desired includes determining that the new HARQ process of the HARQ entity is desired and has an associated first priority. The method also includes, in response to determining that there is not enough unused space in the soft buffer of the second node for the new HARQ process of the HARQ entity, preempting one or more other HARQ processes with a priority lower than the first priority that are using space of the soft buffer of the second node until there is enough unused space in the soft buffer of the second node for the new HARQ process of the HARQ entity. In some embodiments, preempting the one or more other HARQ processes includes preempting the one or more other HARQ processes according to one or more predefined rules. In some embodiments, for each of the one or more other HARQ processes that were preempted, the method also includes transmitting, as an initial transmission, the data associated with the one or more other HARQ processes that were preempted. In some embodiments, the new HARQ process of the HARQ entity is for an Ultra-Reliable and Low Latency Communication (URLLC) transmission to the second node.

In some embodiments, the first node is a radio access node. In some embodiments, the second node is a User Equipment (UE). In some embodiments, the first node and the second node are part of a Fifth Generation (5G) wireless communications network.

In some embodiments, a first node for communicating with a second node which has a soft buffer that is shared by more than one HARQ entity includes at least one processor and memory. The memory includes instructions executable by the at least one processor whereby the first node is operable to determine that a new HARQ process of a HARQ entity is desired; and in response to determining that there is enough unused space in the soft buffer of the second node for the new HARQ process of the HARQ entity, assign the new HARQ process of the HARQ entity for data transmission to the second node.

In some embodiments, a first node for communicating with a second node which has a soft buffer that is shared by more than one HARQ entity includes a soft buffer determination module operable to determine that there is enough unused space in the soft buffer of the second node for a new HARQ process of a HARQ entity; and an assigning module operable to assign the new HARQ process of the HARQ entity for data transmission to the second node.

In some embodiments, a method of operation of a second node which has a soft buffer that is shared by more than one HARQ entity for communicating with a first node includes sending, to the first node, an indication of usage of the soft buffer of the second node and receiving, from the first node, an assignment of a new HARQ process of a HARQ entity for data transmission from the first node.

In some embodiments, a second node which has a soft buffer that is shared by more than one HARQ entity for communicating with a first node includes at least one transceiver and circuitry. The circuitry is operable to send, to the first node, an indication of usage of the soft buffer of the second node and receive, from the first node, an assignment of a new HARQ process of a HARQ entity for data transmission from the first node.

In some embodiments, a second node which has a soft buffer that is shared by more than one HARQ entity for communicating with a first node includes a soft buffer determination module operable to send, to the first node, an indication of usage of the soft buffer of the second node and a reception module operable to receive, from the first node, an assignment of a new HARQ process of a HARQ entity for data transmission from the first node.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

For New Radio (NR) in Third Generation Partnership Project (3GPP), it is being discussed whether to have single or multiple Hybrid Automatic Repeat Request (HARQ) entities to support multiple services served by different numerologies/slot durations. Multiple HARQ entities have the benefit of low design complexity and a single HARQ entity design has the benefit of high HARQ process sharing efficiency. As such, a HARQ design that integrates the benefits of both designs is needed.

Figure 1:
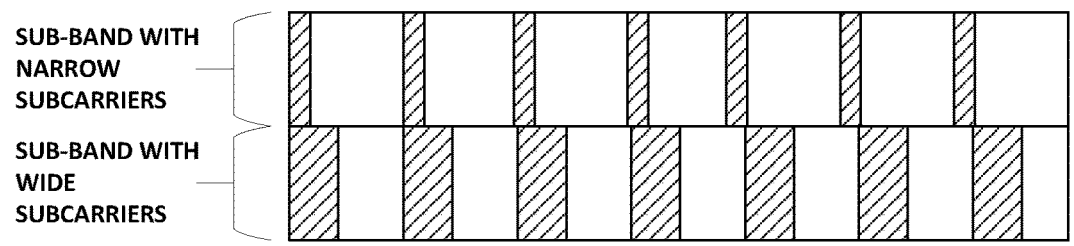
FIG. 1 illustrates mixed numerologies over one Component Carrier (CC) where one sub-band has narrow subcarriers and another sub-band has wide subcarriers.
Figure 2:
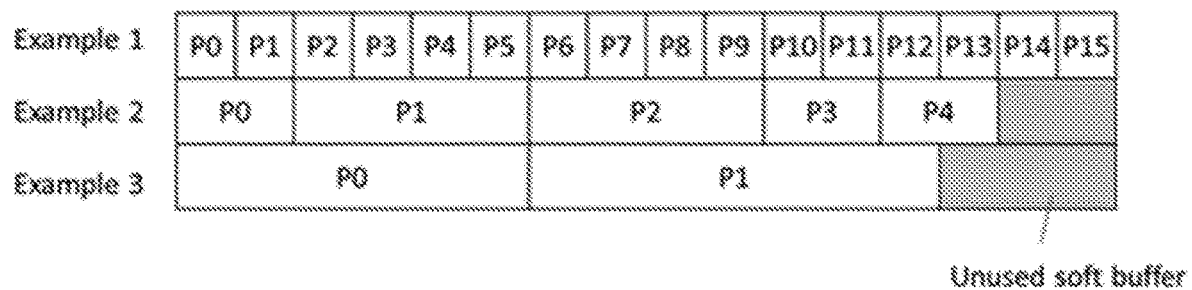
FIG. 2 illustrates an adaptive Hybrid Automatic Repeat Request (HARQ) with single HARQ entity.
Figure 3:
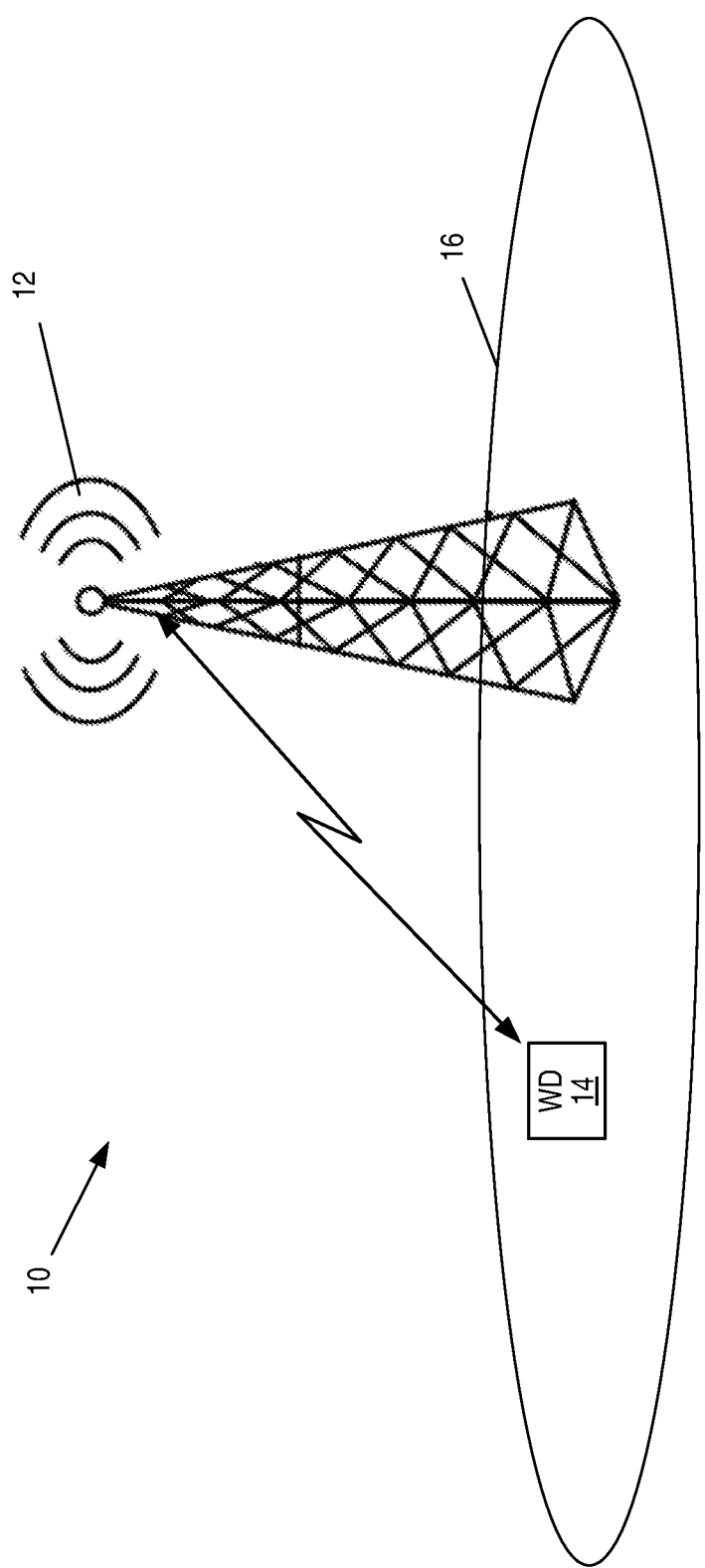
FIG. 3 illustrates an example wireless communications network according to some embodiments of the present disclosure.

HARQ protocol is used to enhance transmission reliability. When an initial transmission is not received correctly by the receiver, the receiver stores the received signal in a soft buffer (implemented in a soft buffer memory, where "soft buffer memory" is physical/hardware memory utilized for the soft buffer) and signals to the transmitter of such unsuccessful transmission. The transmitter can then retransmit the information using the same channel coded bits or different channel coded bits, depending on implementation. The receiver can then combine the retransmission signal with that stored in the soft buffer. Such combining of signals greatly enhances the reliability of the transmission. Incorrectly received coded data blocks may be stored as "soft bits" or soft values. These soft bits indicate what the receiver hypothesizes that the bit is and how certain the receiver is that this is a correct hypothesis. These soft bits can be combined with the retransmitted bits to calculate a more accurate hypothesis. These soft bits are stored in a soft buffer at the receiver so that, when the retransmitted block is received, the received values for the two blocks may be combined. Depending on the implementation, a HARQ process for a HARQ entity may need a certain number of bits to be stored in the soft buffer. As used herein, the total number of bits that the receiver may need for this HARQ process is referred to as the space required by the HARQ process. The space required depends on HARQ entity specific configurations such as HARQ Round-Trip Time (RTT), maximum number of HARQ processes, and the transport block sizes of the data transmissions using the HARQ processes FIG. 3 illustrates one example of a wireless system 10 (e.g., a cellular communications system) in which embodiments of the present disclosure may be implemented. The wireless system 10 includes a first node 12, which in this example is a radio access node. However, the first node 12 is not limited to a radio access node and can be another device such as a general radio node allowing communication within a radio network, including a wireless device as described below. The radio access node 12 provides wireless access to other nodes such as wireless devices or other access nodes, such as a second node 14, within a coverage area 16 (e.g., cell) of the radio access node 12. In some embodiments, the second node 14 is a User Equipment (UE). Note that the term "UE" is used herein in its broad sense to mean any wireless device. As such, the terms "wireless device" and "UE" are used interchangeably herein.

The basic idea is to configure multiple adaptive HARQ entities for multiple numerology/slot duration operation over one carrier and allow dynamic sharing of soft buffer between the HARQ entities. When the transmitter uses a HARQ process from a first HARQ entity for data transmission, the transmitter first determines the total soft buffer being used by all HARQ processes from all HARQ entities. If there is enough soft buffer in the receiver side, the transmitter can assign a soft buffer for data transmission.

Figure 4:
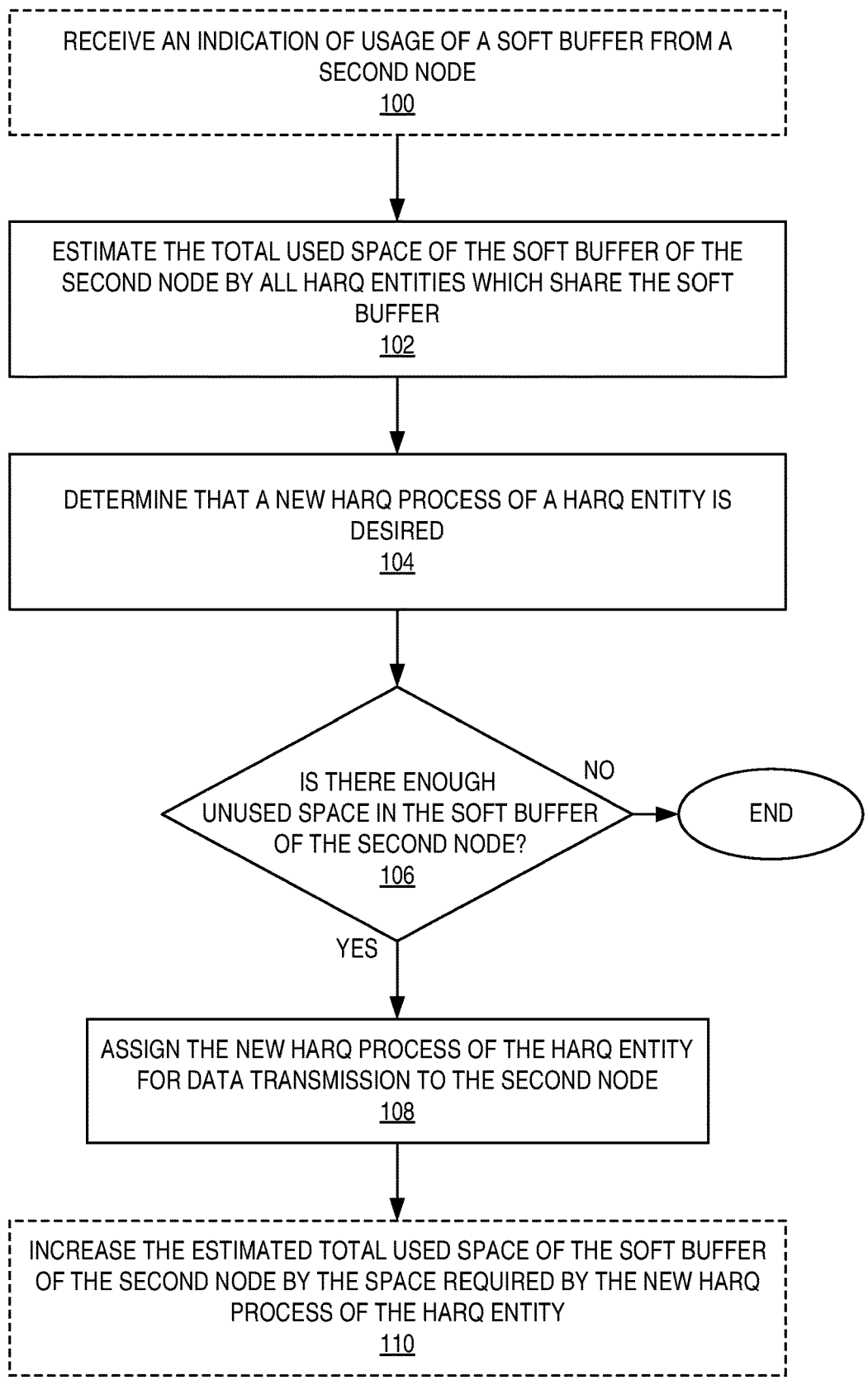
FIG. 4 illustrates a process to assign a HARQ process of a HARQ entity for data transmission according to some embodiments of the present disclosure.

FIG. 4 illustrates a process to assign a HARQ process of a HARQ entity for data transmission according to some embodiments of the present disclosure. First, the first node 12 optionally receives an indication of usage of the soft buffer from the second node 14 (step 100). This indication may be sent from the second node 14 explicitly or as part of some other indication. Additionally, this indication may be a new type of indication that is designed for this specific task or may be an alternate use for an already existing communication. The first node 12 then estimates the total used space of the soft buffer of the second node 14 by all HARQ entities which share the soft buffer (step 102). If the first node 12 knows the total space available in the soft buffer of the second node 14, then the amount of unused space in the soft buffer can be determined directly. In other embodiments, the first node 12 may need to make assumptions of the total space available or use statistic modeling to determine an approximate total space available to the second node 14. This unused space refers to bits that are not used/reserved for a HARQ process of any of the HARQ entities.

FIG. 4 further illustrates that the first node 12 determines that a new HARQ process of a HARQ entity is desired (step 104). This may be a result of determining that a new data transmission should be sent from the first node 12 to the second node 14 that may require the new HARQ process in the event that the data transmission is not correctly decoded. In response to determining that there is enough unused space in the soft buffer of the second node 14 for the new HARQ process of the HARQ entity (step 106), the first node 12 assigns the new HARQ process of the HARQ entity for data transmission to the second node 14 (step 108). In contrast, if there is not enough unused space in the soft buffer of the second node 14, additional steps may be taken as will be discussed below in relation to FIG. 7.

In some embodiments, after assigning the new HARQ process of the HARQ entity for data transmission to the second node 14, the first node 12 increases the estimated total used space of the soft buffer of the second node 14 by the space required by the new HARQ process of the HARQ entity (step 110). As discussed above, the space required may depend on HARQ entity specific configurations such as HARQ RTT, maximum number of HARQ processes, and the transport block sizes of the data transmissions using the HARQ processes.

Figure 5:
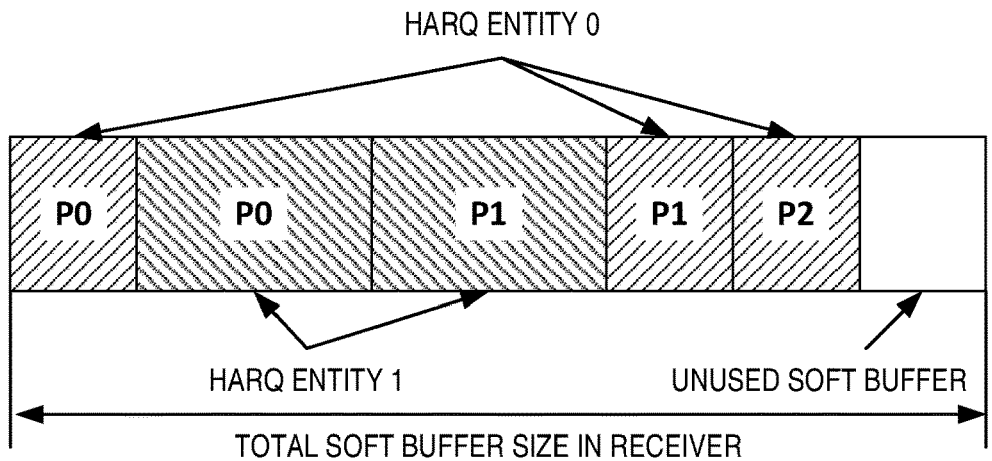
FIG. 5 illustrates an example of soft buffer usage with two adaptive HARQ entities according to some embodiments of the present disclosure.

FIG. 5 illustrates an example of soft buffer usage with two adaptive HARQ entities according to some embodiments of the present disclosure. There are three HARQ processes in use (i.e., a HARQ process in pending state) for HARQ entity 0 (P0, P1, and P2), for which the required soft buffer of a HARQ process is relatively small. Meanwhile, there are two HARQ processes in use for HARQ entity 1 (P0 and P1), for which the required soft buffer by a HARQ process is relatively large. The difference in the amount of space required by the two different HARQ entities could be due to HARQ entity specific configurations such as HARQ RTT, maximum number of HARQ processes, and the transport block sizes of the data transmissions using the HARQ processes. The total soft buffer in use should not exceed the total soft buffer in the receiver side.

At receiving HARQ feedback for one HARQ entity, the transmitter may re-estimate the unused soft buffer in the receiver side. The unused soft buffer value is increased at receiving an Acknowledgement (ACK). This is because the soft buffer space needed for the proper decoding of that HARQ process is no longer needed in the receiver since the data transmission is properly decoded. When a Negative Acknowledgement (NACK) or Discontinuous Transmission (DTX) is received, the soft buffer value is not changed. This is because the soft buffer space needed for the proper decoding of that HARQ process may still be needed in the receiver since the data transmission has not been properly decoded or the transmitter is unsure if the data transmission has been properly decoded.

Figure 6:
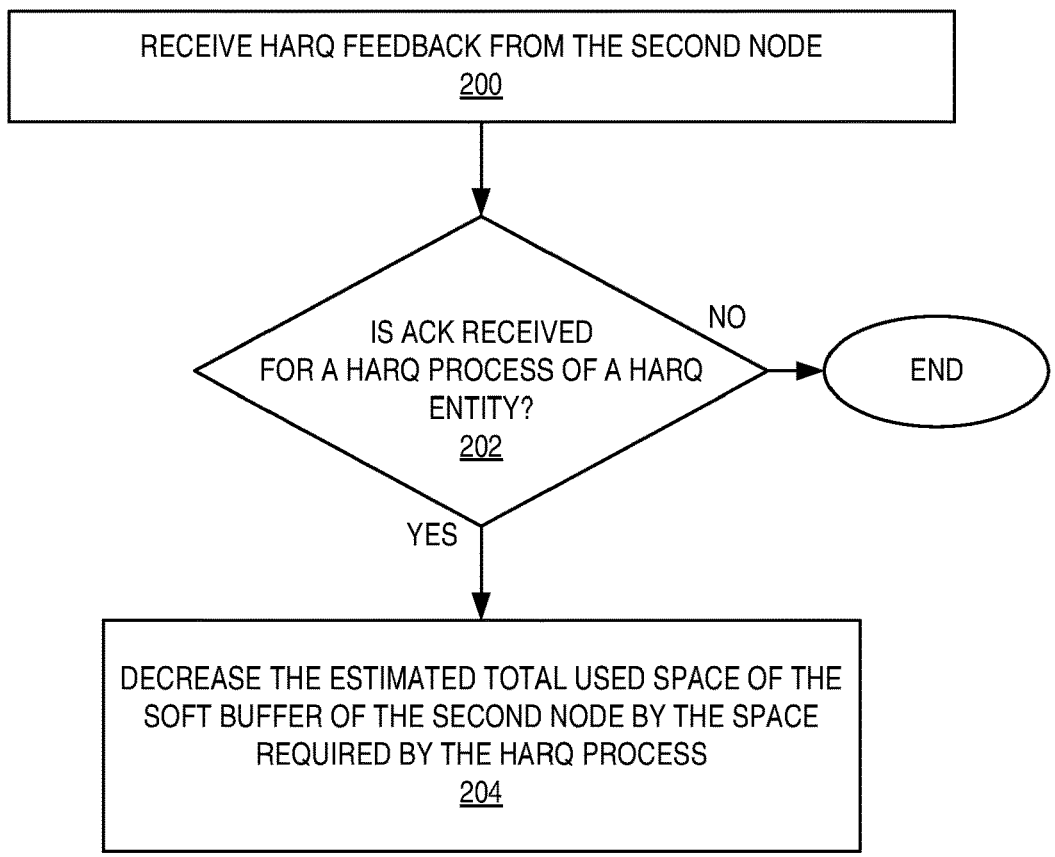
FIG. 6 illustrates a process to update an estimated total used space of a soft buffer according to some embodiments of the present disclosure.

FIG. 6 illustrates a process to update an estimated total used space of a soft buffer according to some embodiments of the present disclosure. The first node 12 receives a HARQ feedback from the second node 14 for a second HARQ process of a second HARQ entity (step 200). Notably, this could be the same HARQ process described above but is not required to be. In response to determining that the HARQ feedback is an ACK (step 202), the first node 12 decreases the estimated total used space of the soft buffer of the second node 14 by the space required by the second HARQ process (step 204). As discussed above, this may be because the soft buffer space needed for the proper decoding of that HARQ process is no longer needed in the receiver since the data transmission is properly decoded.

Another chance to increase the unused soft buffer value is when the maximum time limit or the maximum transmission attempts of a HARQ process is reached. Again, in this case, the soft buffer space needed for the proper decoding of that HARQ process is no longer needed in the receiver since the data transmission will be started again.

While the preceding discussion has focused on the first node 12 estimating the amount of the soft buffer that is being used and possibly estimating the total size of the soft buffer, other embodiments are also possible. For instance, in some embodiments, the second node 14 can report the soft buffer size for multiple HARQ entities. This indication could either be sent via specific Radio Resource Control (RRC) signaling or as a part of a UE capability report.

In some embodiments, a HARQ process may be sufficiently important such that even determining that there is not enough unused space may not stop the HARQ process from being assigned. However, since the total used soft buffer should not exceed the total soft buffer of the receiver, additional steps may be necessary. For instance, in some embodiments, the system can be preconfigured such that one HARQ entity of higher priority uses the soft buffer when there is a lack of soft buffer in the receiver side. At a lack of soft buffer, the HARQ process of higher priority can preempt the soft buffer being used by another HARQ process of lower priority. This allows the flexibility of the transmitter to transmit the high priority data as early as possible. In some embodiments, the preemption can be performed according to predefined rules so that the transmitter can determine preemption status. In some embodiments, the transmitter retransmits the data associated with the preempted HARQ processes as initial transmission when the soft information is flushed due to the preemption.

Figure 7:
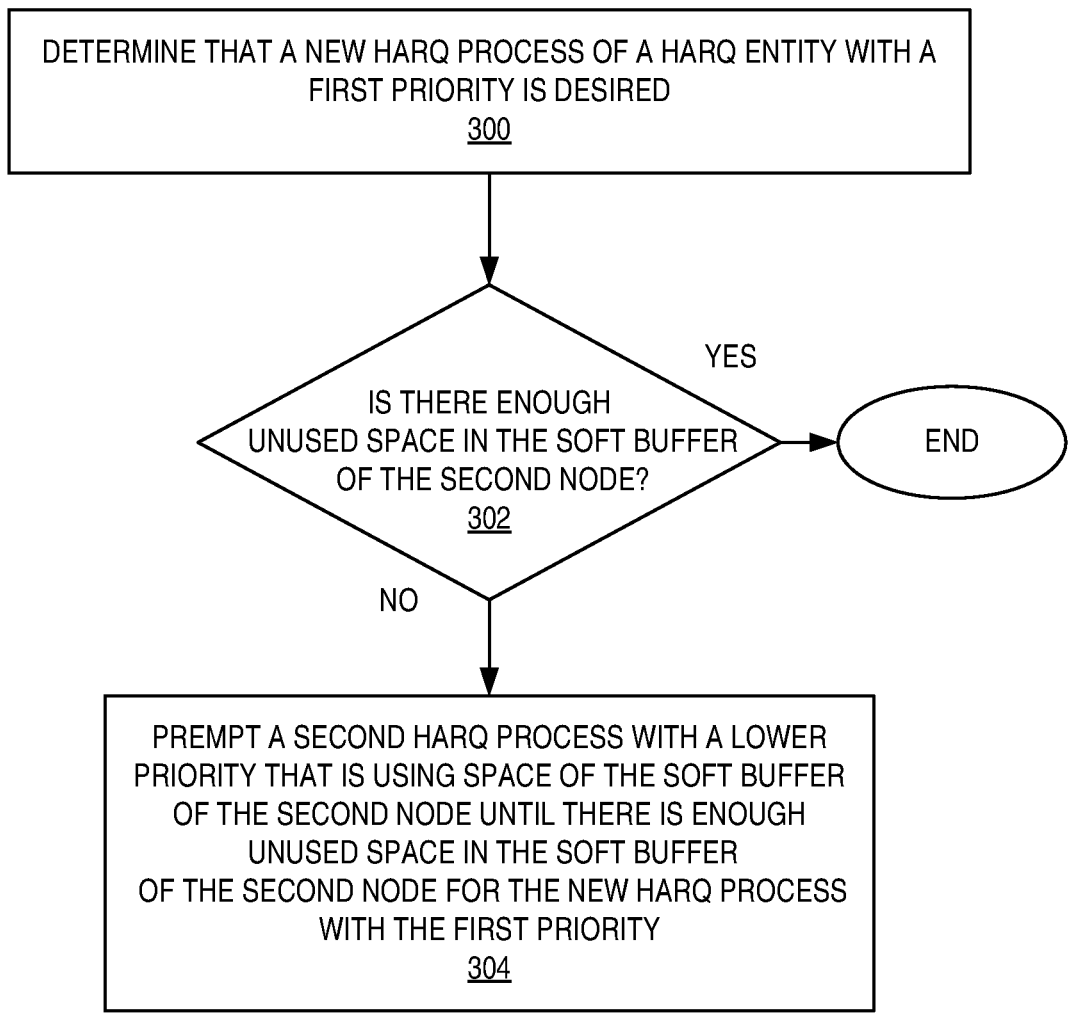
FIG. 7 illustrates a process to preempt a HARQ process with a lower priority to accommodate a HARQ process with higher priority according to some embodiments of the present disclosure.

FIG. 7 illustrates a process to preempt a HARQ process with a lower priority to accommodate a HARQ process with higher priority according to some embodiments of the present disclosure. Similarly to step 104 discussed above, the first node 12 determines that the new HARQ process of the HARQ entity is desired that has an associated first priority (step 300). Then, in response to determining that there is not enough unused space in the soft buffer of the second node 14 for the new HARQ process of the HARQ entity (step 302), the first node 12 preempts one or more other HARQ processes with a priority lower than the first priority that are using space of the soft buffer of the second node 14 until there is enough unused space in the soft buffer of the second node 14 for the new HARQ process of the HARQ entity (step 304). These priorities can be specific values that can be compared against each other or may be determined based on a class of transmissions. For instance, a transmission of mMTC traffic typically does not require low delay or high data rate. As such, these transmissions may have a lower priority than transmissions for URLLC which may require low delay and/or high reliability. These different priority levels can be implemented in several different ways. Also, the communication of which HARQ processes to preempt may be implemented in several ways. In some embodiments, the first node 12 may communicate to the second node 14 that a certain amount of space is required for a priority transmission, with or without a specific priority level. In some embodiments, the first node 12 may indicate that certain HARQ processes should be preempted based on priority levels known to the first node 12.

Apart from the soft buffer sharing between HARQ entities, the other configurations such as maximum number of retransmissions, HARQ feedback timing (i.e. HARQ RTT), HARQ feedback channel, resources and encoding, etc. can be HARQ entity respective. That is, the benefits of a multiple HARQ entity design are preserved while maintaining the memory efficiency of a single HARQ entity design.

Figure 8:
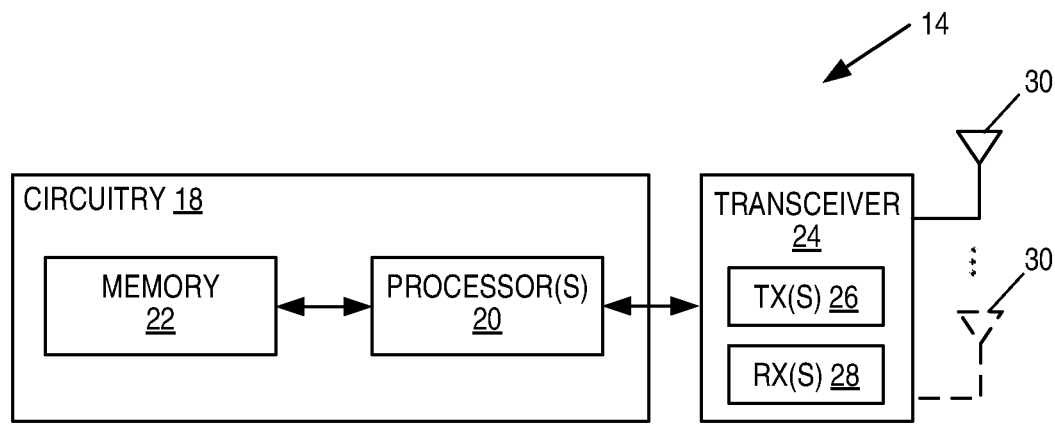
FIG. 8 is a block diagram of a User Equipment device (UE) according to some embodiments of the present disclosure.
Figure 9:
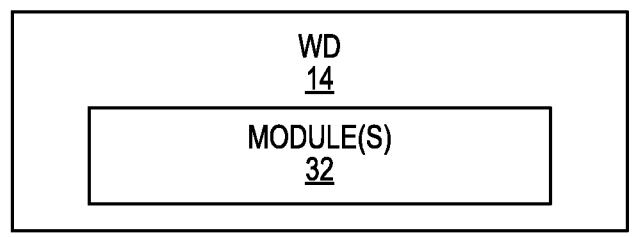
FIG. 9 is a block diagram of a UE according to some other embodiments of the present disclosure.

FIGS. 8 and 9 illustrate example embodiments of the second node 14 such as a wireless device 14 according to some embodiments of the present disclosure. FIG. 8 is a schematic block diagram of the wireless device 14 (e.g., a UE 14) according to some embodiments of the present disclosure. As illustrated, the wireless device 14 includes circuitry 18 comprising one or more processors 20 (e.g., Central Processing Units (CPUs), Application Specific Integrated Circuits (ASICs), Field Programmable Gate Arrays (FPGAs), and/or the like) and memory 22. The wireless device 14 also includes one or more transceivers 24 each including one or more transmitter 26 and one or more receivers 28 coupled to one or more antennas 30. In some embodiments, the functionality of the wireless device 14 described above may be fully or partially implemented in software that is, e.g., stored in the memory 22 and executed by the processor(s) 20.

In some embodiments, a computer program including instructions which, when executed by at least one processor, causes the at least one processor to carry out the functionality of the wireless device 14 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

FIG. 9 is a schematic block diagram of the wireless device 14 according to some other embodiments of the present disclosure. The wireless device 14 includes one or more modules 32, each of which is implemented in software. The module(s) 32 provide the functionality of the wireless device 14 (e.g., UE 14) described herein.

Figure 10:
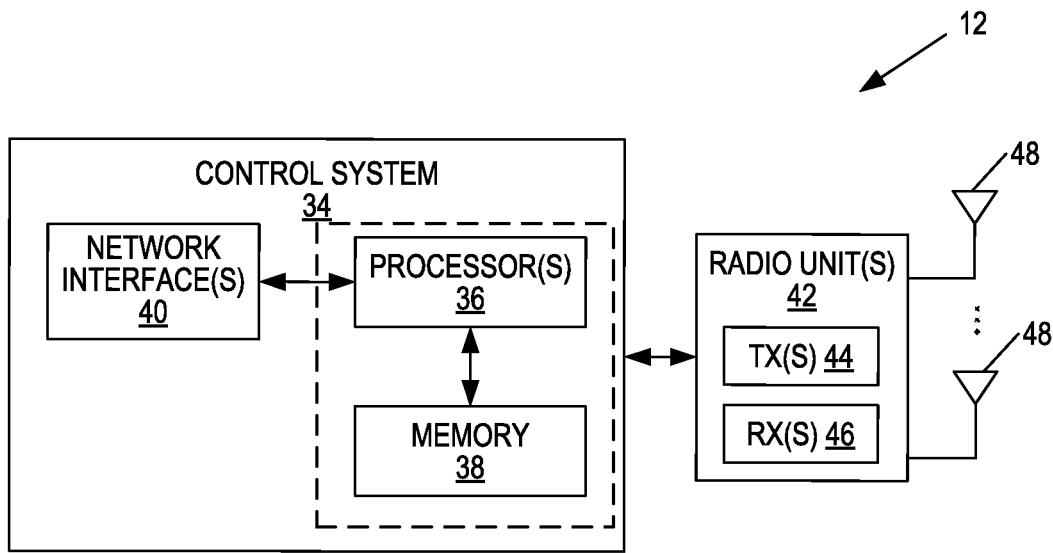
FIG. 10 is a block diagram of a network node according to some embodiments of the present disclosure.
Figure 12:
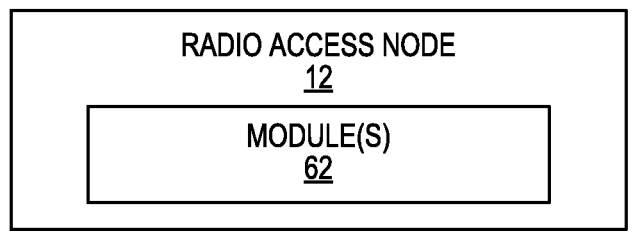
FIG. 12 is a block diagram of a network node according to some embodiments of the present disclosure.
Figure 11:
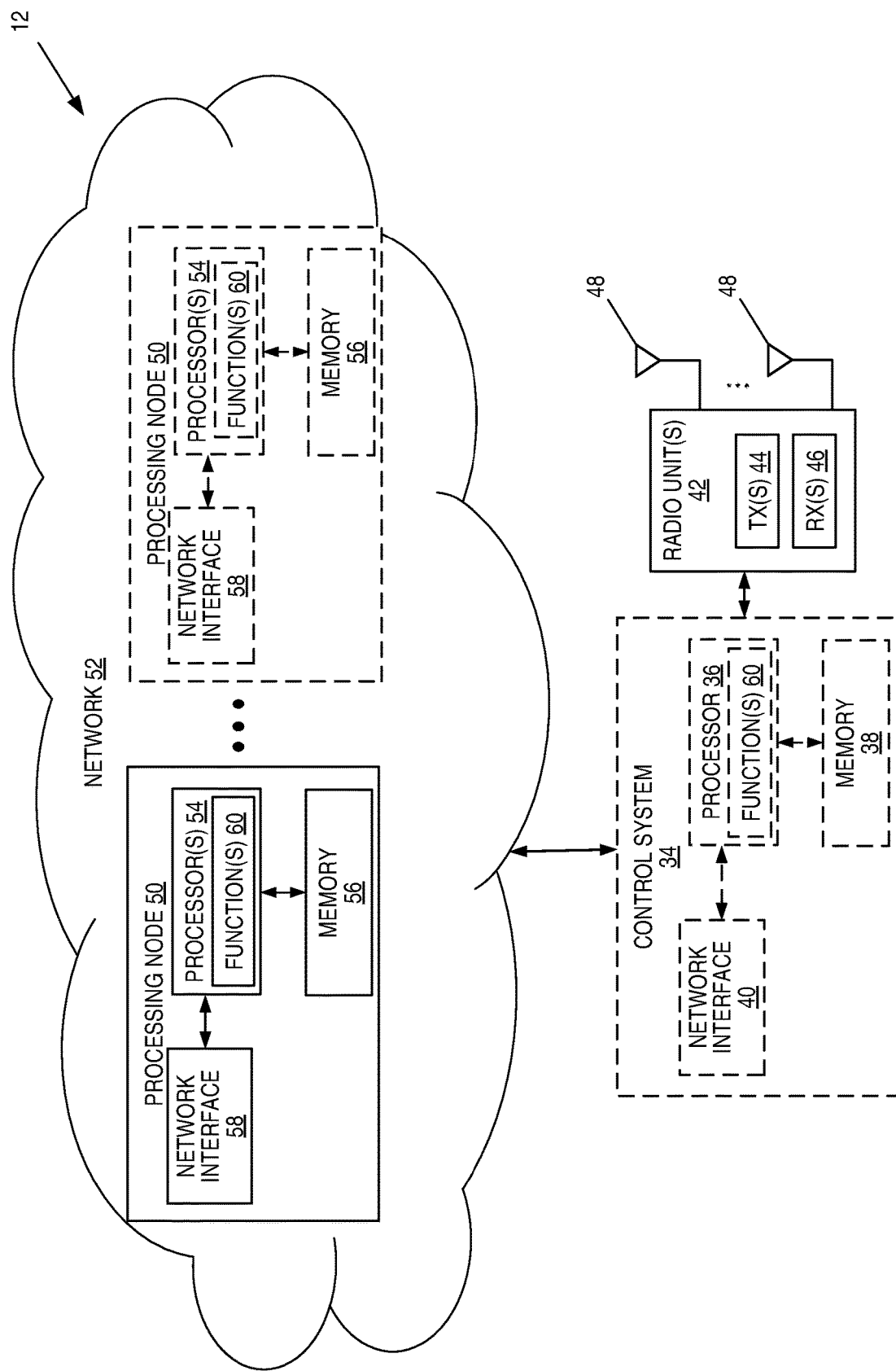
FIG. 11 is a block diagram of a network node according to some embodiments of the present disclosure.

FIGS. 10 through 12 illustrate example embodiments of a radio network node according to some embodiments of the present disclosure. FIG. 10 is a schematic block diagram of the first node 12 according to some embodiments of the present disclosure. Other types of network nodes may have similar architectures (particularly with respect to including processor(s), memory, and a network interface). As illustrated, the radio access node 12 includes a control system 34 that includes circuitry comprising one or more processors 36 (e.g., CPUs, ASICs, FPGAs, and/or the like) and memory 38. The control system 34 also includes a network interface 40. The radio access node 12 also includes one or more radio units 42 that each include one or more transmitters 44 and one or more receivers 46 coupled to one or more antennas 48. In some embodiments, the functionality of the radio access node 12 described above may be fully or partially implemented in software that is, e.g., stored in the memory 38 and executed by the processor(s) 36.

FIG. 11 is a schematic block diagram that illustrates a virtualized embodiment of the radio access node 12 according to some embodiments of the present disclosure. Other types of network nodes may have similar architectures (particularly with respect to including processor(s), memory, and a network interface).

As used herein, a "virtualized" radio access node 12 is a radio access node 12 in which at least a portion of the functionality of the radio access node 12 is implemented as a virtual component (e.g., via a virtual machine(s) executing on a physical processing node(s) in a network(s)). As illustrated, the radio access node 12 optionally includes the control system 34, as described with respect to FIG. 10. The radio access node 12 also includes the one or more radio units 42 that each include the one or more transmitters 44 and the one or more receivers 46 coupled to the one or more antennas 48, as described above. The control system 34 (if present) is connected to the radio unit(s) 42 via, for example, an optical cable or the like. The control system 34 (if present) is connected to one or more processing nodes 50 coupled to or included as part of a network(s) 52 via the network interface 40. Alternatively, if the control system 34 is not present, the one or more radio units 42 are connected to the one or more processing nodes 50 via a network interface(s). Each processing node 50 includes one or more processors 54 (e.g., CPUs, ASICs, FPGAs, and/or the like), memory 56, and a network interface 58.

In this example, functions 60 of the radio access node 12 described herein are implemented at the one or more processing nodes 50 or distributed across the control system 34 (if present) and the one or more processing nodes 50 in any desired manner. In some particular embodiments, some or all of the functions 60 of the radio access node 12 described herein are implemented as virtual components executed by one or more virtual machines implemented in a virtual environment(s) hosted by the processing node(s) 50. As will be appreciated by one of ordinary skill in the art, additional signaling or communication between the processing node(s) 50 and the control system 34 (if present) or alternatively the radio unit(s) 42 is used in order to carry out at least some of the desired functions. Notably, in some embodiments, the control system 34 may not be included, in which case the radio unit(s) 42 communicates directly with the processing node(s) 50 via an appropriate network interface(s).

In some embodiments, a computer program including instructions which, when executed by at least one processor, causes the at least one processor to carry out the functionality of the radio access node 12 or a processing node 50 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

FIG. 12 is a schematic block diagram of the radio access node 12 according to some other embodiments of the present disclosure. The radio access node 12 includes one or more modules 62, each of which is implemented in software. The module(s) 62 provide the functionality of the radio access node 12 described herein.

The following acronyms are used throughout this disclosure.

- 3GPP Third Generation Partnership Project
- 5G Fifth Generation
- ACK Acknowledgement
- ASIC Application Specific Integrated Circuit
- CC Component Carrier
- CPU Central Processing Unit
- DCI Downlink Control Information
- DTX Discontinuous Transmission
- eMBB Enhanced Mobile Broadband
- eNB Enhanced or Evolved Node B
- FPGA Field Programmable Gate Array
- HARQ Hybrid Automatic Repeat Request
- kHz Kilohertz
- LTE Long Term Evolution
- MAC Medium Access Control
- mMTC Massive Machine Type Communication
- MTC Machine Type Communication
- NACK Negative Acknowledgement
- NR New Radio
- QoS Quality of Service
- RAN Radio Access Network
- RRC Radio Resource Control
- RTT Round-Trip Time
- UE User Equipment
- URLLC Ultra-Reliable and Low Latency Communication Those skilled in the art will recognize improvements and modifications to the embodiments of the present disclosure. All such improvements and modifications are considered within the scope of the concepts disclosed herein and the claims that follow.

What is claimed is:

1. A method of operation of a first node for communicating with a second node which has a soft buffer that is shared by more than one Hybrid Automatic Repeat Request, HARQ, entity for multiple slot duration operation over one carrier, comprising:
    determining that a new HARQ process of a HARQ entity is desired; and
    in response to determining that there is enough unused space in the soft buffer of the second node for the new HARQ process of the HARQ entity, assigning the new HARQ process of the HARQ entity for data transmission to the second node;
    wherein determining that the new HARQ process of the HARQ entity is desired comprises determining that the new HARQ process of the HARQ entity is desired and has an associated first priority, the method further comprising:
    in response to determining that there is not enough unused space in the soft buffer of the second node for the new HARQ process of the HARQ entity, preempting one or more other HARQ processes with a priority lower than the first priority that are using space of the soft buffer of the second node until there is enough unused space in the soft buffer of the second node for the new HARQ process of the HARQ entity.

2. The method of claim 1 further comprising:
    receiving an indication of usage of the soft buffer from the second node; and
    estimating a total used space of the soft buffer of the second node by all HARQ entities which share the soft buffer.

3. The method of claim 1 further comprising:
    after assigning the new HARQ process of the HARQ entity for data transmission to the second node, increasing an estimated total used space of the soft buffer of the second node by a space required by the new HARQ process of the HARQ entity.

4. The method of claim 1 further comprising:
    receiving a HARQ feedback from the second node for a second HARQ process of a second HARQ entity; and
    in response to determining that the HARQ feedback is an acknowledgement, ACK, decreasing an estimated total used space of the soft buffer of the second node by the space required by the second HARQ process.

5. The method of claim 1 wherein preempting the one or more other HARQ processes comprises preempting the one or more other HARQ processes according to one or more predefined rules.

6. The method of claim 1 further comprising:
for each of the one or more other HARQ processes that were preempted, transmitting, as an initial transmission, the data transmission associated with the one or more other HARQ processes that were preempted.

7. The method of claim 1 wherein the first node is a radio access node.

8. The method of claim 1 wherein the second node is a User Equipment, UE.

9. The method of claim 1 wherein the first node and the second node are part of a Fifth Generation, 5G, wireless communications network.

10. The method of claim 1 wherein the new HARQ process of the HARQ entity is for an Ultra-Reliable and Low Latency Communication, URLLC, transmission to the second node.

11. A first node for communicating with a second node which has a soft buffer that is shared by more than one Hybrid Automatic Repeat Request, HARQ, entity for multiple slot duration operation over one carrier, comprising:
at least one processor; and
memory comprising instructions executable by the at least one processor whereby the first node is operable to:
  determine that a new HARQ process of a HARQ entity is desired; and
  in response to determining that there is enough unused space in the soft buffer of the second node for the new HARQ process of the HARQ entity, assign the new HARQ process of the HARQ entity for data transmission to the second node;
  wherein determining that the new HARQ process of the HARQ entity is desired comprises the first node being operable to determine that the new HARQ process of the HARQ entity is desired and has an associated first priority; and
  in response to determining that there is not enough unused space in the soft buffer of the second node for the new HARQ process of the HARQ entity, preempt one or more other HARQ processes with a priority lower than the first priority that are using space of the soft buffer of the second node until there is enough unused space in the soft buffer of the second node for the new HARQ process of the HARQ entity.

* * * * *